Oct. 2, 1934.  W. C. JONES  1,975,463
SWING AND EXERCISING DEVICE
Filed Dec. 29, 1930
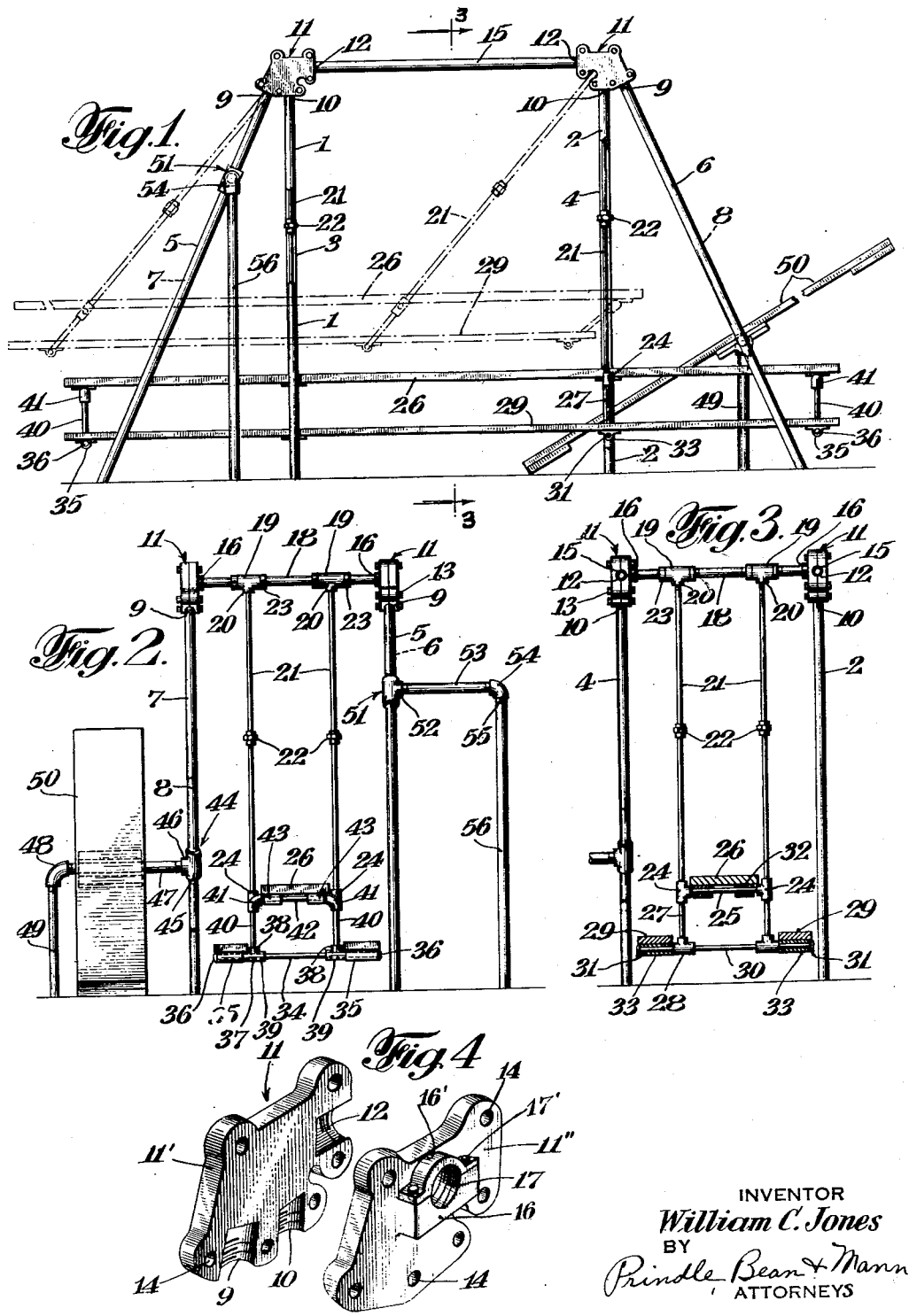
INVENTOR
William C. Jones
BY
Prindle Bean & Mann
ATTORNEYS Patented Oct. 2, 1934

1,975,463

UNITED STATES PATENT OFFICE 1,975,463

SWING AND EXERCISING DEVICE

William C. Jones, Niantic, Ill.

Application December 29, 1930, Serial No. 505,254

3 Claims. (Cl. 155—58)

This invention relates to a swing which is provided with an elongated seat member for supporting a plurality of persons.

One object of this invention is the provision of a device in which the seat member maintains a horizontal position during the entire period of swinging.

Another object of this invention is the provision of a device which includes a frame which is adapted to rest on the ground without the use of fastening means.

To the accomplishment of the foregoing and such other objects as may hereinafter appear, this invention consists in the construction, combination, and arrangement of parts hereinafter described and then sought to be defined in the appended claims, reference being had to the accompanying drawing forming a part hereof, and which shows merely for the purpose of illustrative disclosure, a preferred embodiment of my invention, it being expressly understood, however, that various changes may be made in practice within the scope of the claims without digressing from my inventive idea.

In the drawing:

Figure 1 represents a side elevation of a device embodying my invention, the dotted lines showing the swing in one position.

Figure 2 represents an end elevation showing the position of the teeter board and the horizontal bar or trapeze.

Figure 3 represents a vertical sectional view taken on line 3—3 of Figure 1, and Figure 4 represents an enlarged perspective view of the joint or connecting member for holding the frame members together, the joint or connecting member being made of three parts.

In the drawing, numerals 1, 2, 3 and 4 designate the vertical members of the frame which may be made of tubular material such as a heavy pipe, or may be of solid material. At the ends of the frame are the inclined members 5, 6, 7 and 8, which may be made of the same material as the vertical members. The vertical members and the inclined members are either threaded or clamped at one end into the threaded or smooth openings 9 and 10, respectively, of the joint or connecting members 11.

There are four such joints or connecting members 11, one for each corner of the frame. Each of these members 11 is formed of two complementary flat sections 11' and 11'', each half portion being provided with the semi-cylindrical threaded or smooth semi-cylindrical depressions 9, 10 and 12 so that when the two ections are placed together and fastened by means of bolts or rivets 13 passing through the openings 14, the semi-cylindrical openings will align to form threaded cylindrical openings for receiving the ends of the pipe members of the frame.

The opening 12 in each member 11 is positioned horizontally and extends substantially at right angles to the opening 10 and is adapted to receive the threaded end of horizontal pipe member 15 which connects two of the joints or connecting members 11. It will be noted that each pair of the members 11 is in alignment and that the openings 12 in each member face each other and there are two horizontal enlongated parallel pipe members 15 connecting the joints 11. One flat section of each joint or connecting member 11 is provided with a two part hub having the lower portion 16 cast integrally with the member 11 and being formed with a semi-circular depression. The upper removable portion comprises a cap 16' having a semi-circular opening to mate with the depression in lower portion 16 to form an opening 17 to receive the end of connecting member 18. The lower portion 16 and upper portion 16' are secured together by the bolts 17'. The opening 17 may be smooth or screw threaded. The openings 17 of each pair of joints or connecting members are so arranged that they face each other and form a means for holding the short members 18 substantially at right angles to elongated members 15 to form a closed rectangular structure. It will be apparent that the vertical members, the inclined members, and the horizontal connecting members 15 and 18, together with the four joints or connecting members 11, form a rigid structure or frame which is adapted to rest on the surface of the ground without imbedding the frame members in concrete pillars or otherwise fastening the frame to the ground.

Rotatably mounted on each cross member 18 are the sleeves 19 which are each provided with the threaded opening 20 which receives the threaded end of each suspending rod or tubular member 21. The sleeves 19 may be welded or clamped to ends of rods 21. There are four such members 21. In order to make a device which may be easily assembled, the member 21 is made of two parts which are connected by the coupling 22. Each sleeve member 19 for the suspending rods 21 is prevented from being moved or displaced laterally by means of spaced pins 23 which project from the short horizontal members 18 of the frame.

Near the lower end of each suspending member 21 is the T member 24, the member 24 being connected by threaded rods 25 which are adapted to receive the seat member 26. The parts may be connected by pins or may be bolted or welded.

Extending from the lower portion of each T member 24 is a short threaded member 27, the ends of which are received by the horizontal T members 28. These parts may be connected as by pins, bolting, welding or any suitable means. Connecting these T members 28 and adapted to receive the elongated foot boards 29 are the connecting rods 30 which are provided with the heads 31 on each end thereof. The elongated seat member 26 is connected to the connecting rod 25 by means of the bearing members 32 which are secured to the under side of the seat member and which are movably mounted on the connecting rods 26, between T members 24. These bearing members may be in the form of heavy metal strips which are bent around the connecting rods, the ends of the strip or strap being connected to the under side of the seat member, or they may be bearing members which are secured to the seat member. The elongated foot boards 29 have a similar connection with the connecting rod 30 by means of the bearing members 33 which are positioned between the horizontally disposed T members 28 and the heads 31 on the rod 30. These foot boards are positioned below and to each side of the seat member. The seat member, the foot boards and the pivoted suspending means are, of course, mounted and swing between vertical members 1, 2, 3 and 4.

At each end the seat member 26 and the foot boards 29 are connected by means of the following construction, which holds the member 26 and seat board 29 in spaced relation, but allows pivotal movement therebetween. The foot boards 29 are movably mounted on the connecting rod 34 by means of the bearing members 35 held on the rod 34 by means of the heads 36 on the ends of the rod 34. These bearing members are similar to bearing members 32 and 33 previously described. Each rod 34 passes through the long arm 37 of the T member 39. Extending from the short extension 38 on the inverted T member 39 is the short vertical rod 40 provided at its ends with the elbows 41. These elbows 41 on each vertical rod 40 are connected by means of a short horizontal rod 42 which has threaded engagement with the elbows 41. The seat member 26 is connected to the horizontal rods 42 by means of the bearing members 43 which are similar to the ones already described.

Inclined member 8 is provided near its lower end with the T member 44 having its long portion 45 in alignment with member 8 and the short extension 46 is adapted to receive the threaded end of the horizontal pipe 47, the other end of pipe member 47 being threaded into an elbow 48. Extending from the other opening in the elbow 48 is a vertical pipe member 49 which is adapted to rest on the ground. Mounted on the horizontal pipe member 47 is a teeter board 50. The inclined member 5 is provided with a T 51 near its upper end. The short extension 52 of the T member 51 receives the threaded end of the horizontal pipe member 53 which has an elbow 54 on its other end. Extending from the other end 55 of the elbow 54 to the ground is a vertical pipe member 56. This latter provides a horizontal bar which is an added feature of my device.

From the foregoing description of this device and from an inspection of the drawing, it will be apparent that I have invented a simple and reliable structure in which the seat member and foot boards maintain a horizontal position during the entire period of swinging from one end to the other.

What I claim is:

1. In a device of the character described, a frame adapted to rest on the surface of the ground, said frame comprising a plurality of pipe members, means for connecting said pipe members, said means including a plurality of connecting members, one of said members being formed of two complementary sections formed with a plurality of threaded openings for receiving the ends of the pipe members of said frame, a seat member, a foot board, pivoted means suspended from said frame and bearing means for connecting said seat member and said foot board to said pivoted suspending means.

2. In a device of the character described, a frame adapted to rest on the surface of the ground, said frame comprising a plurality of pipe members, means for connecting said pipe members, said means including a plurality of connecting members, one of said members being formed of two complementary sections formed with a plurality of threaded openings for receiving the ends of the pipe members of said frame, a seat member, a foot board, pivoted means suspended from said frame and bearing means mounted on said seat member and said foot board for connecting said seat member and said foot board to said pivoted suspending means.

3. In a swing of the character described, a frame adapted to rest on the surface of the ground, said swing frame comprising a plurality of pipe members, means for connecting said pipe members, a seat member, a foot member, pivoted means suspended from said connecting means and connected to said foot member and said seat member intermediate the ends thereof, and means for connecting the adjacent ends of said seat member and said foot member, said means including a plurality of bearing means mounted on said seat member and said foot member.

WILLIAM C. JONES.